(12) United States Patent  
Tang

(10) Patent No.: US 6,611,826 B1  
(45) Date of Patent: Aug. 26, 2003

(54) METHOD OF LEARNING BINARY SYSTEM

(75) Inventor: Zheng Tang, Miyazaki-ken (JP)

(73) Assignee: Sowa Institute of Technology Co., Ltd., Miyazaki (JP)

( * ) Notice: Subject to any disclaimer, the term of this patent is extended or adjusted under 35 U.S.C. 154(b) by 0 days.

(21) Appl. No.: 09/403,318

(22) PCT Filed: Feb. 18, 1999

(86) PCT No.: PCT/JP99/00724

§ 371 (c)(1),  
(2), (4) Date: Jan. 18, 2000

(87) PCT Pub. No.: WO99/42928

PCT Pub. Date: Aug. 26, 1999

(30) Foreign Application Priority Data

Feb. 20, 1998 (JP) .......................................... 10-056101

(51) Int. Cl.[7] .................................................. G06N 3/02
(52) U.S. Cl. .............................. 706/45; 706/23; 706/25
(58) Field of Search .............................. 706/45, 23, 33, 706/25, 41

(56) References Cited

U.S. PATENT DOCUMENTS

| | | | | |
|---|---|---|---|---|
| 4,774,677 A | * | 9/1988 | Buckley | 706/23 |
| 5,524,175 A | * | 6/1996 | Sato et al. | 706/41 |
| 5,706,403 A | * | 1/1998 | Shibata et al. | 706/25 |
| 5,710,869 A | * | 1/1998 | Godefroy et al. | 706/41 |
| 5,717,832 A | * | 2/1998 | Steimle et al. | 706/33 |

FOREIGN PATENT DOCUMENTS

JP 60-204118 10/1985

OTHER PUBLICATIONS

Kennedy, J.V.; Austin, J., A hardware implementation of a binary neural associative memory, Microelectronics for Neural Networks and Fuzzy Systems, 1994., Proceedings of the Fourth International Conference on, Sep. 26–28, 1994, Page(s): 178–185.*

Habib, M.K.; Akel, H.; Newcomb, R.W., Logic gate formed neuron type processing element, Circuits and Systems, 1988., IEEE International Symposium on, Jun. 7–9, 1988, Page(s): 491–494 vol. 1.*

Shibate, T.; Nakai, T.; Ning Mei Yu; Yamashita, Y.; Konda, M.; Ohmi, T., Advances in neuron–MOS applications, Solid-State Circuits Conference, 1996. Digest of Technical Papers. 42nd ISSCC., 1996 IEEE International, Feb. 8–10, 1996, Page(s): 304–305, 463.*

* cited by examiner

Primary Examiner—Wilbert L. Starks, Jr.  
(74) Attorney, Agent, or Firm—Crowell & Moring LLP

(57) ABSTRACT

A binary learning system characterized by consisting of an input layer having binary input terminals, a coupling layer, a first binary gate layer with first similar logical elements, a second binary gate layer with second similar logical elements, and an output layer, so as to form a learning network, in that each coupling condition between the adjacent layers limited to one way directing from their inlet side to the outlet side, and each layer has independent routes without mutual coupling conditions, the coupling layer having means for selecting either one of a direct coupling condition and a coupling condition routed through an inverter, relative to routes from the respective signal units in the input layer to the respective signal units in the first binary gate layer, in such manner that the selected coupling condition is adapted to eliminate or decrease the respective errors between original output signals at the output layer and monitor signals in the learning network.

12 Claims, 10 Drawing Sheets

| THE TRUE TABLE | | | | |
|---|---|---|---|---|
| $X_1$ | $X_2$ | $X_3$ | $X_4$ | Z |
| 0 | 0 | 0 | 0 | 1 |
| 0 | 0 | 0 | 1 | |
| 0 | 0 | 1 | 0 | |
| 0 | 0 | 1 | 1 | 1 |
| 0 | 1 | 0 | 0 | |
| 0 | 1 | 0 | 1 | |
| 0 | 1 | 1 | 0 | |
| 0 | 1 | 1 | 1 | 1 |
| 1 | 0 | 0 | 0 | |
| 1 | 0 | 0 | 1 | |
| 1 | 0 | 1 | 0 | 1 |
| 1 | 0 | 1 | 1 | |
| 1 | 1 | 0 | 0 | |
| 1 | 1 | 0 | 1 | |
| 1 | 1 | 1 | 0 | 1 |
| 1 | 1 | 1 | 1 | 1 |
FIG.11
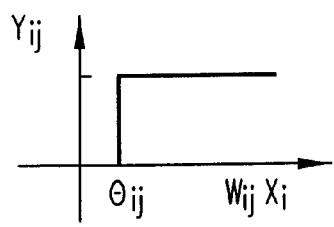
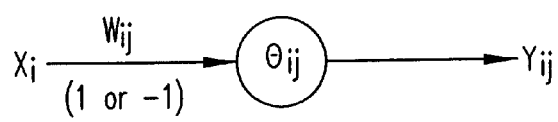
FIG.12a  FIG.12b

EXPLANATION OF COUPLING CONDITION ACCORDING TO THE SUSPECTED NEURON

| WEIGHT $W_{ij}$ | THRESHOLD $\theta_{ij}$ | INPUT $X_i$ | OUTPUT $Y_{ij}$ | COUPLING CONDITION |
|---|---|---|---|---|
| 1 | -1.5 | 0 | 1 | ALL [1] COUPLING |
| | | 1 | 1 | |
| | -0.5 | 0 | 1 | ALL [1] COUPLING |
| | | 1 | 1 | |
| | 0.5 | 0 | 0 | DIRECT COUPLING |
| | | 1 | 1 | |
| | 1.5 | 0 | 0 | ALL [0] COUPLING |
| | | 1 | 0 | |
| -1 | -1.5 | 0 | 1 | ALL [1] COUPLING |
| | | 1 | 1 | |
| | -0.5 | 0 | 1 | THE THROUGH INVERTER COUPLING |
| | | 1 | 0 | |
| | 0.5 | 0 | 0 | ALL [0] COUPLING |
| | | 1 | 0 | |
| | 1.5 | 0 | 0 | ALL [0] COUPLING |
| | | 1 | 0 | |

FIG.13

METHOD OF LEARNING BINARY SYSTEM

BRIEF DISCLOSURE OF THIS INVENTION

This invention is a learning binary network system characterized, by consisting of an input layer, a coupling layer, a first binary gate layer with first similar logical elements, a second binary gate layer with second similar logical elements, and an output layer, in that each coupling condition between the adjacent layers limited to one way directing from their inlet side to the outlet side, and each layer has independent routes without mutual coupling conditions, the coupling layer having means for selecting either one of a direct coupling condition and a coupling condition routed through an inverter, relative to routes from the respective signal units in the input layer to the respective signal units in the first binary gate layer in the learning network.

DETAILED DESCRIPTION OF INVENTION

1. The Technical Field of this Invention

This invention relates to a binary learning system applied to such as character recognition, robot motion control and association memory.

2. The Prior Arts

A learning system has been known as a neural network. The neural network means a circuit consisting of suspected elements of neural cells (neuron) in a network in the same as basic information treating units for function of neural cells of a living body, the neural network applied to such as character recognition, robot motion control and association memory.

A neuron NE as one unit indicated in FIG. 17, consists of means for receiving input signal from the other neuron, means for changing the input signal under a determined rule in coupling conditions, means for limiting its changing threshold, and means for putting out the changed output. And in the coupling condition to the other neuron, a weight [Wij] indicating a coupling power is additionally attached to the unit.

The coupling condition of this neuron includes an exciting coupling (Wij>0)indicating a condition in that the more increase input of its self is then the more increase input from the other neuron, and a suppressing coupling (Wij<0) indicating a condition in that the more decrease input of its self is then the more increase input from the other neuron in reverse. Then the changing of this weight [Wij] and threshold θi course the changed constitution of the network.

FIG. 18 indicates neutral network consisting of neuron NE mentioned above, which includes an input layer, a medium layer and an output layer, each layer having no coupling condition therein, and the medium layer being capable of use of a plurality of layers. Such network is actuated so as to propagate the input signal of the input layer to the medium layer, and then the signal therein being changed with coupling coefficient, or weight and threshold, as resultant of propagating to the output layer. In the output layer, the signal is further treated as an output signal Z by addition of any weight and threshold.

Input NEX in the medium and output layers is counted by FORMULA 19 mentioned hereinafter.

FORMULA 19

Then, the neuron input NEX puts out after non-linear treatment. Further, output Yj or Zj in the medium and output layers is obtained by Sigmoid coefficient so indicated as to FORMULA 20 in general.

FORMULA 20

In this case, the leaning means to change the weight and threshold to decrease or put preferably to zero, an error between the real output Zj and a prescribed output Tj (monitor signal). This changing value is given in a manner to use error-propagating in reverse, and the changing value in the formula mentioned above is different to the neuron in the input layer or medium layer.

In analog circuits applied to the mentioned network, signal intensity of the input or output exists as a voltage, the weight of the neuron is a resistance existing on each neuron line, and the neuron output coefficient (Sigmoid coefficient) is a propagating coefficient of an amplifier. And in order to indicate the exiting and suppressing couples between the neurons, the output of the amplifier is separated to two outputs, so as to generate a plus or minus signal by reversing one of the outputs through an inverter.

The mentioned system including the analog circuits involves problems mentioned hereinafter.

a. Irregular operations of neuron elements are generated due to the temperature property.

b. As to control the error between the real output Z and monitor output T mentioned above, the error revisable circuit is complicated as well as the error introducing to zero is difficult.

c. The use of amplifier induces the further complication and large size of circuit, and the operating time is extended and causes in such difficulty that the corporation network is not produced.

Already, digital circuits for neutral network are proposed in the Japanese publication document of the patent application, its publication number being 108594/93. In this case, all neuron elements consists of logic elements without the irregular operations due to their temperature property.

However, the system having the digital circuits mentioned above involves problems described hereinafter.

a. For signal propagation between the respective layers, pulse uses so as to indicate pulse density (pulse counts per unit time) as amount of analog signal. Accordingly, this system is incapable of error control into zero and wastes long operation time.

b. The volume of each neuron element is increased, thereby causing the largest and expanded construction of the neutral network.

c. As learning, the changing value of the weight and threshold must be controlled in the respective medium and output layers under use of the prior constitution of the neutral network.

In order to solve the problems mentioned above, this inventor had proposed a new binary learning system consisting of logical elements as shown in FIG. 1, disclosed to U.S patent application Ser. No. 744,299/96.

The learning network consists of an input layer 21 having a plurality of binary input terminals X1, X2, . . . Xn, a coupling layer 22, a first binary gate layer (AND layer) 23 with a plurality of similar logical elements (for instance, AND logic), a second binary gate layer (OR layer) 24 with a plurality of similar logical elements (for instance, OR logic), and an output layer 25, the respective layers having no coupled therein and the coupling condition between the mutual layers being limited to a way only directed from the input layer to the output layer (Feed forward type).

The couple in the coupling layer, between each units of the input layer and each units of AND layer, is selected to coupling conditions mentioned hereinafter.

(1) direct coupling
(2) coupling through an inverter
(3) all [1] coupling
(4) all [0] coupling The coupling layer applied to the coupling conditions mentioned above can consist of suspected neurons, and then the learning network is produced as shown in FIG. 14.

In this case, one unit of OR layer 24 is only shown in FIG. 14 for easy explanation, and the respective output terminal Z is only one.

The suspected neurons NE, as shown in FIG. 12, exist one input and one output, the weight Wij from the input is either one of 1 or −1 and the threshold θij is selected to −1.5, −0.5, 0.5 and 1.5.

Then, the output Yij given by the input Xi, weight Wij and threshold θij is all indicated in four coupling conditions mentioned above. And the output Yij is calculated by FORMULA 3 or FORMULA 4 mentioned hereinafter

FORMULA 3 or

FORMULA 4

As learning, error E between the real output Z and monitor output T can be obtained by FORMULA 5 as nextly mentioned.

FORMULA 5

In this case, the learning is accomplished with control of the weight Wij and threshold θij, as similar to the prior idea. When the weight Wij and threshold θij are controlled according to error E lowering downwards in the highest speed, their control values ΔW and Δθ are obtained by FORMULA 1 or FORMULA 6.

FORMULA 1 or

FORMULA 6

εw, εθ are to plus and are calculated as mentioned hereinafter, by the learning rule under use of the error propagation in reverse.

FORMULA 7

The output in this case, is only one, therefore

FORMULA 8

Accordingly,

FORMULA 9

Since it relates Z=OR,

FORMULA 10

As results, the signal at OR gate is resembled by a continuous coefficient mentioned hereinafter.

FORMULA 11

Herein, M is the maximum value in approximate inputs without ANDi, namely, M=Max(ANDi, i=1, 2, 3 . . . , i≠j), FIG. 15 indicates this real value. Then,

FORMULA 12

Similarly, the signal at AND gate is resembled by a continuous coefficient mentioned hereinafter.

FORMULA 13

Herein, m is the minimum value in approximate inputs without ANDi, namely, m=Min(ANDi, i=1, 2, 3 . . . , i≠j), FIG. 16 indicates this real value. Then,

FORMULA 14

Finally,

FORMULA 15

Then,

FORMULA 16

Since it is f'(x)>0, the control values ΔW of the weight Wij and Δθ of the threshold are obtained under f'(x)=1, by FORMULA 17.

FORMULA 17

If εw=2, εw, εθ=1, then

FORMULA 18

In the mentioned formula, all values are binary count, then the control values indicate the output signal Z, monitor signal T, and the AND output signals ANDi, Yi and Xi as logical forms.

As mentioned above, this case indicates the binary learning system in that NE includes one input and one output, and Wij, θj, Yij, ΔWij, Δdθij, etc., are binary indicated, as well as the output Yij of NE is indicated in four coupling conditions mentioned above, thus as the learning operation causes to control the coupling condition between the respective inputs Xi of the input layer and the respective units (AND) of the first gate layer. Accordingly, it is accomplished that the learning network is in a simple constitution, the learning time is rather shortened, and more particularly, the error E is easily induced into zero.

THE SUBJECT OF THIS INVENTION

However, the learning network mentioned above and disclosed in the U.S. Patent application, includes four coupling conditions, though the outputs of units of the coupling layer are in binary counts.

If a learning network operated in two coupling conditions may be produced in the present time, it causes the most simple constitution of the units of the coupling layer, the error revising circuit, and preferably, all the learning network in hardware technique.

Accordingly, the learning network mentioned above should be further improved for simple constitution of the network.

This invention is proposed to improve a binary learning network system in that the learning is exactly and quickly accomplished, and the constitution is the most simplified.

THE SUMMARY OF THIS INVENTION

For solving various problems mentioned above, this invention newly provides a binary learning system characterized by consisting of an input layer having binary input terminals, a coupling layer, a first binary gate layer with first similar logical elements, a second binary gate layer with second similar logical elements, and an output layer, so as to form a learning network, in that each coupling condition between the adjacent layers limited to one way directing from their inlet side to the outlet side, and each layer has independent routes without mutual coupling conditions, the coupling layer having means for selecting either one of a direct coupling condition and a coupling condition routed through an inverter, relative to routes from the respective signal units in the input layer to the respective signal units in the first binary gate layer, in such manner that the selected coupling condition is adapted to eliminate or decrease the respective errors between original output signals at the output layer and monitor signals in the learning network.

In this invention, the binary learning system mentioned above including a process mentioned herein after:

(1) One of the coupling conditions is so selected as to learn under the case in that the original output signal is different from the monitor signal, and neglect the learning under the case in that the both signals mentioned above are as the same.

(2) The learning is so practiced as to select one of the coupling conditions between the signal units in the input layer and the signal units in the first binary gate layer in order of the unit selection from the highest position to the lowest position in the first binary gate layer, and to select all input terminals in each unit in the same time or the highest position to the lowest position in the input layer.

(3) The learning after selecting the coupling condition to the lowest positioned unit, is again carried on to the highest position as necessary.

In this invention including the binary learning system mentioned above, the first and second logical elements include pluralities of OR gate and AND gate circuits respectively in their orders.

And in the binary learning system mentioned above, the first and second logical elements include pluralities of AND gate and OR gate circuits respectively in their orders.

Further, in the binary learning system mentioned above, the first and second logical elements include pluralities of NAND gate and NAND gate circuits respectively.

In another case of the binary learning system mentioned, the first and second logical elements include pluralities of NOR gate and NOR gate circuits respectively.

Finally, in the binary learning system, the first and second logical elements include pluralities of EXOR gate and EXOR gate circuits respectively.

The other feature and advantage of this invention will be apparently described with reference to the drawings as follows.

THE EMBODIMENTS OF THIS INVENTION

FIG. 11 is the true table for logic coefficient.

FIG. 12 in which (a) is a graph indicating the threshold coefficient of the suspected neuron, and (b) is a mathematical typed illustration for the suspected neuron.

FIG. 13 is the explanation illustrates the coupling condition according to the suspected neuron.

Figure 14:
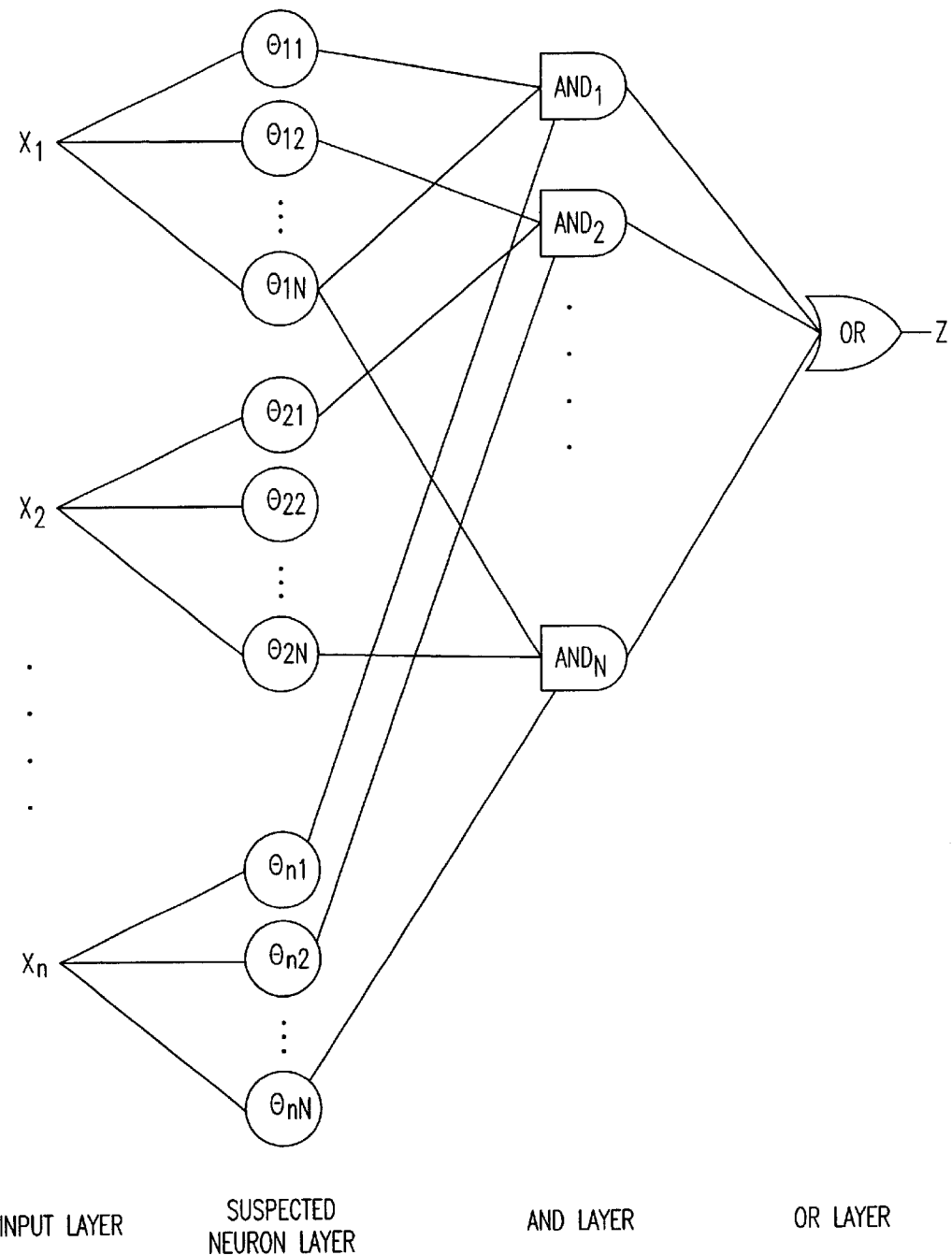

FIG. 14 is the learning network with the binary system in which the suspected neuron is used, generally illustrated.

Figure 15:
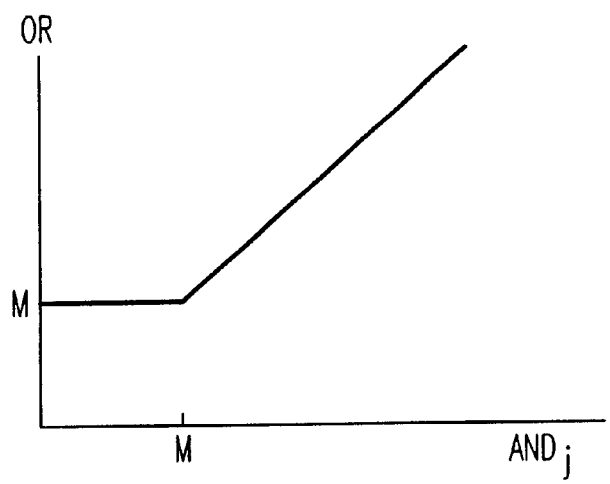

FIG. 15 is the graph indicates the suspected neuron to OR.

Figure 16:
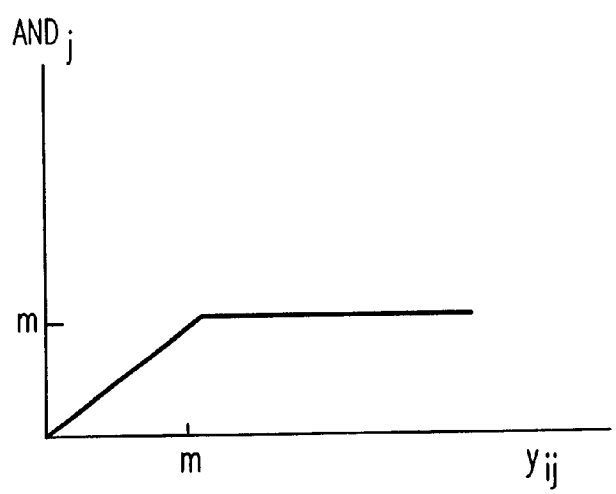

FIG. 16 is the graph indicates the suspected neuron to AND.

Figure 17:
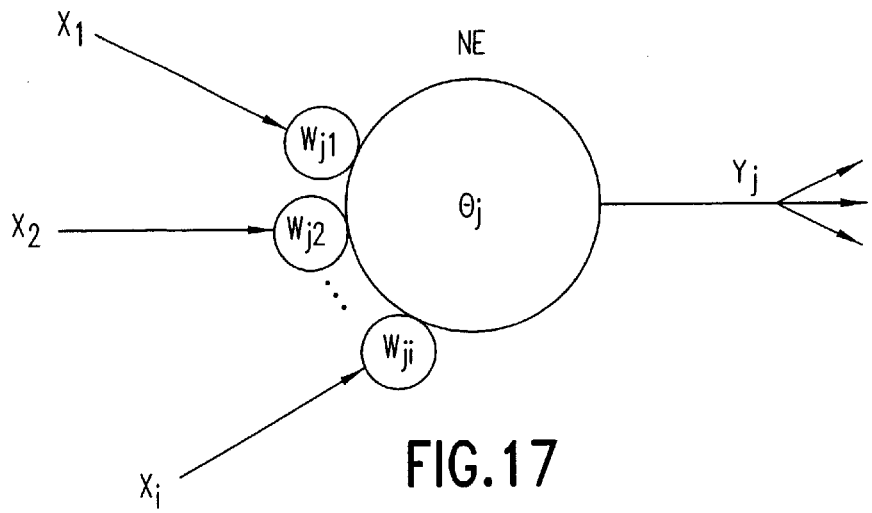

FIG. 17 is the explanation illustrates the neuron NE as unit.

Figure 18:
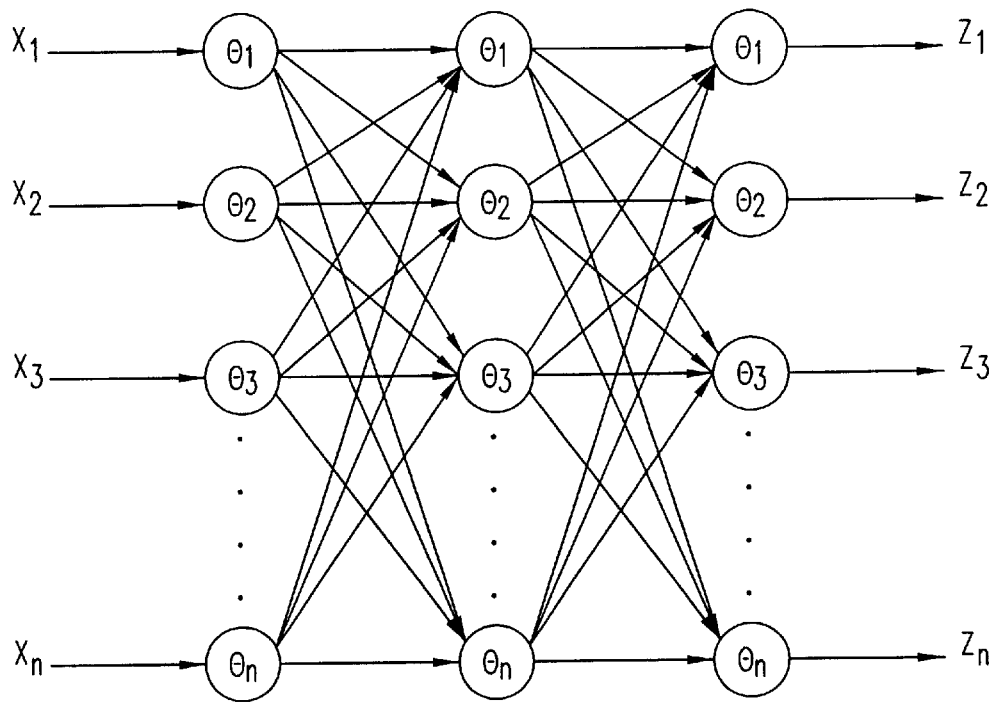

And finally, FIG. 18 is the neutral network consisting of neuron NE illustrated.

An embodiment of this invention according to an improved binary learning network system is disclosed hereinafter in respect of figures.

The learning network of this invention will be explained and detailed with AND-OR network in which as being shown in FIG. 1, a first binary gate and a second binary gate consist AND layer and OR layer respect-lively.

Namely, the learning network includes an input layer 21 having binary input terminals X1, X2 . . . , Xn, a coupling layer 22, a first binary gate layer (AND layer) 23 with a plurality of AND logic units, a second binary gate layer (OR layer) 24 with a plurality of OR logic units and an output layer 25 having output terminals respective to each units of the OR layer 24.

In the network, the interior of each layers has no coupling condition and the coupling between the layers is limited to one way as propagated from the input layer 21 to the output layer 24 (Feed forward type), in which the coupling between AND layer 23 and OR layer 24 is constant and the coupling in the coupling layer 22 from each unit of the input layer 21 to each unit of the AND layer 23 is selected to either one of two coupling conditions mentioned hereinafter so as to control the learning operation.

(1) direct coupling (2) coupling through an inverter

In this case, the coupling layer 22 is applied to join each unit of the input layer 21 to each unit of the AND layer 23 respectively.

The principle of this embodiment will be explained as follows, as instance, the logical coefficient from the relation of logical variable indicated.

FORMULA 2

This formula is capable to be arranged to a logic circuit by logical elements.

Accordingly, in order to obtain the same output Z according to input patterns (for instance, a plurality of input illustration pattern) relative to each other, consisting of X1, X2 . . . , Xi, it is capable to control the coupling condition (in the coupling layer 22) between the input layer 21 and AND layer 23.

Figure 1:
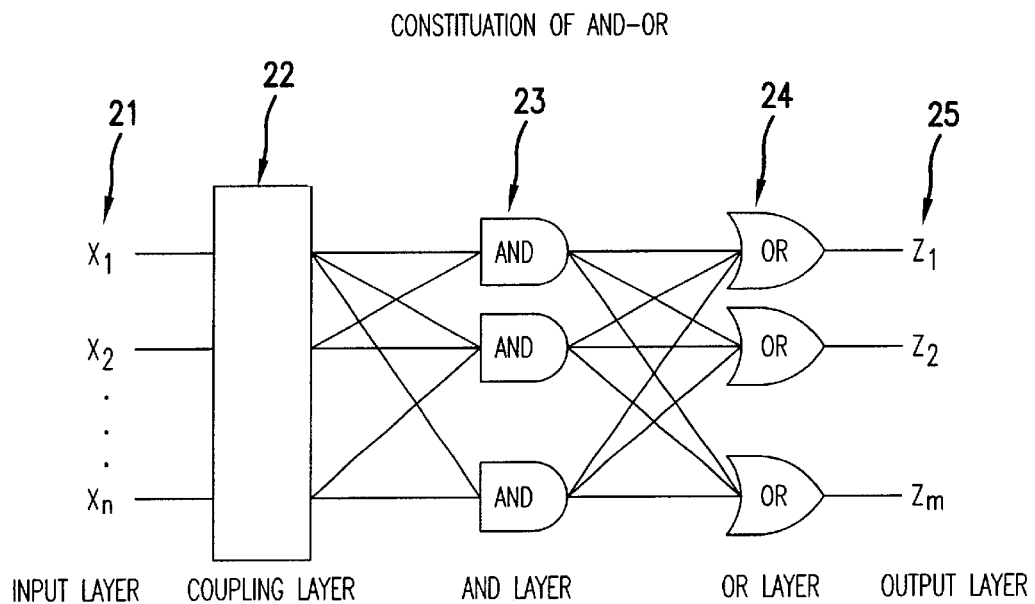
FIG. 1 is the embodiment of this invention in which a binary system for learning network consists of AND layer and OR layer, illustrated to blocks.

Thus, the learning operation in the learning network as shown in FIG. 1 is accomplished due to the control of the coupling condition in the coupling layer between each unit of the input layer 21 and each unit of the AND layer 23 so as to accord the output Z in the constant input pattern with X1, X2 . . . , Xi.

In the binary system, since the signals exist only two, the coupling condition can be disclosed to either of the direct coupling or the through-inverter coupling.

In order to set up the two conditions between the input layer 21 and AND layer 23, namely, the direct coupling or the through-inverter coupling, this system indicates a signal by one bit, for instance, by setting up the direct coupling to 1 and the through-inverter coupling to 0.

Figure 2:
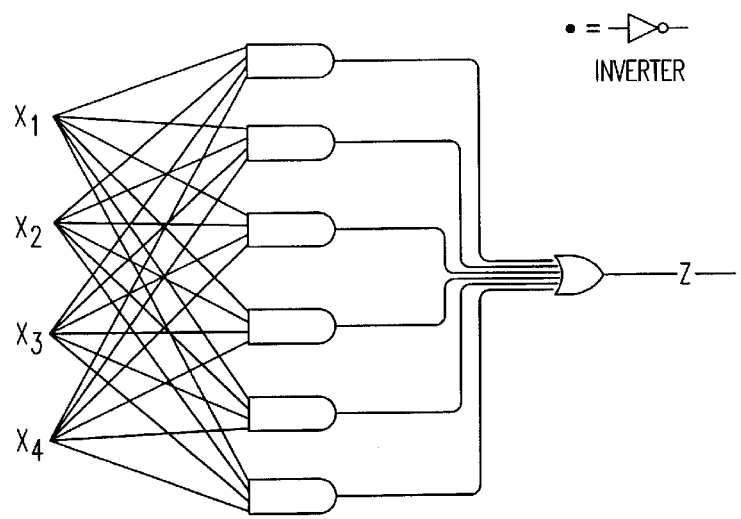
FIG. 2 is the logic circuit according to true table illustrated in FIG. 11.

FIG. 2 indicates a case in that the required logical elements are at least 6, if the input patterns from X1, X2, X3, X4 are 6 when the input terminals are four and the output Z is one.

In the case of FIG. 1, it is sufficient to provide with the first binary gate layer,i.e., AND layer 23 having AND units of $2^{(n-1)}+1$ (namely, the half of $2^{(n)}$) if the input layer 21 including n pieces of input terminals according to input patterns of $2^{(n-1)}+1$ or less than them and the output layer 23 with same output pattern with Z1, Z2 . . . , Zn.

Figure 3:
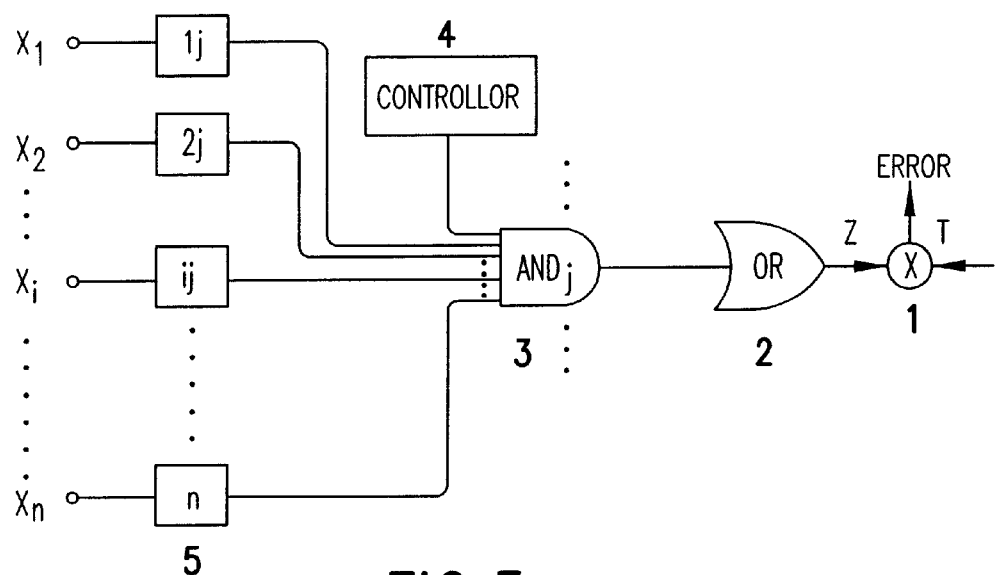
FIG. 3 is the network indicating only one output as 1 bit, illustrated.

The mentioned embodiment is explained by circuits of FIG. 1 as follows. For example, FIG. 1 indicates the learning network including only one bit in the output, according to the network shown in FIG. 3. Herein, An exclusive OR supplies an error signal by the real output Z and monitor output T so that the respective inputs X1, . . . , Xn through the respective coupling circuits propagate to AND gates 3, and then to a control circuit 4. In this case, ANDj gate is one of AND gates and propagates to OR gate 2.

A coupling circuit 5 receives a renewal signal for selected coupling condition from a control circuit 4, and cause to propagate input X to the AND gate, as direct thereto as it is 1, and as through an inverter thereto as it is 0.

Figure 4:
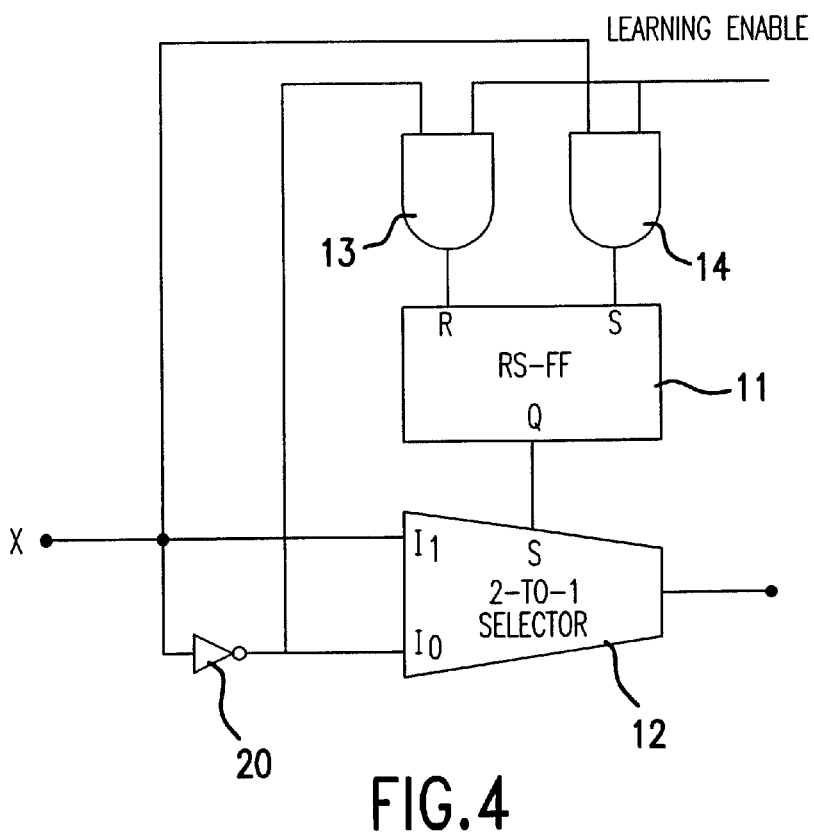
FIG. 4 is the logic circuit for practicing a coupling circuit, illustrated.

FIG. 4 indicates a logical circuit for carrying such as coupling circuit. In this case, RS-FF11 is RS flip-flop used to indicate the coupling condition between the input terminal X and AND gate of the AND layer. [2-to-1 selector] 12 is operated as to select either one of the direct coupling and the through-inverter coupling between X and AND according to the condition of the RS-FF11.

In the RS-FF11, it set up as S=1 and R=0, so as to output 1, it reset as S=0 and R=1, and it keep the memory of the forward signal as S=R=0. Accordingly, when the renewal condition signal in the control circuit 4 is changed to 1, RS condition is renewal with AND gates 13 and 14, i.e., if X is 1, 1 outputs to the AND gate 14 and 0 to the AND gate 13 so that RS-FF11 sets up 1, and in reverse, if X is 0, 1 outputs to the AND gate 13 and 0 to the AND gate 14 so that RS-FF11 resets.

Figure 6:
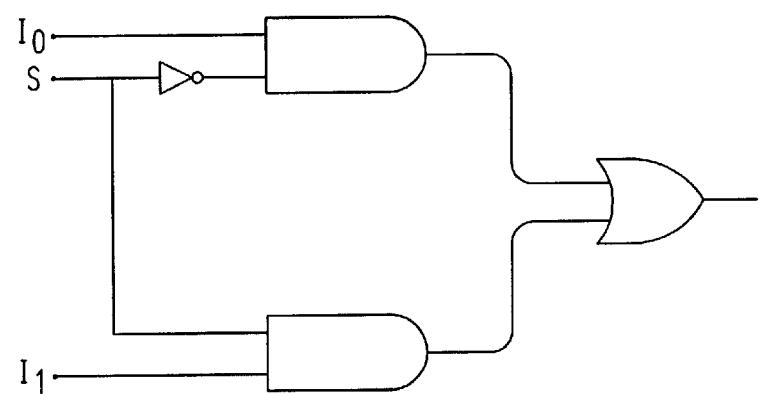
FIG. 6 is the logic circuit of 2-to-1 selector, illustrated.
Figure 7:
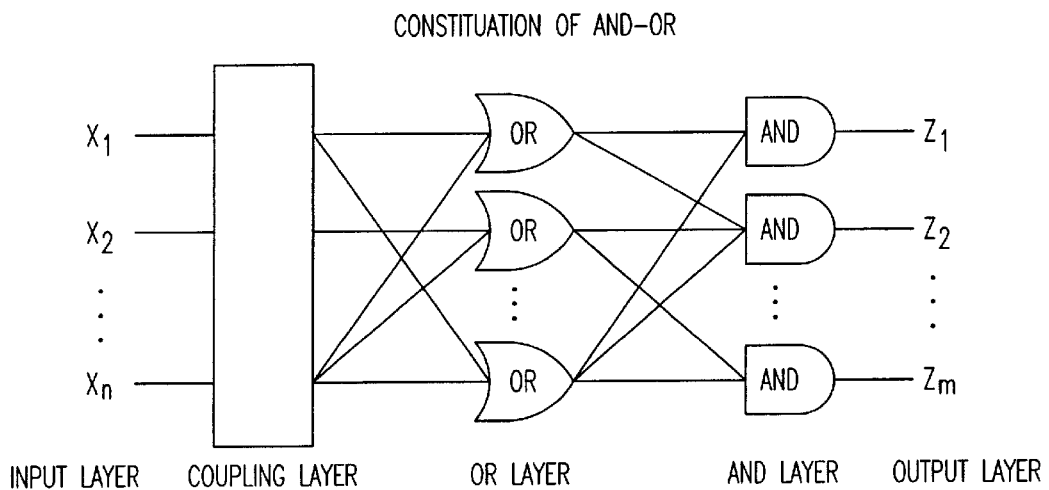
FIG. 7 is the learning network with the binary system including OR layer and AND layer, illustrated to blocks.
Figure 8:
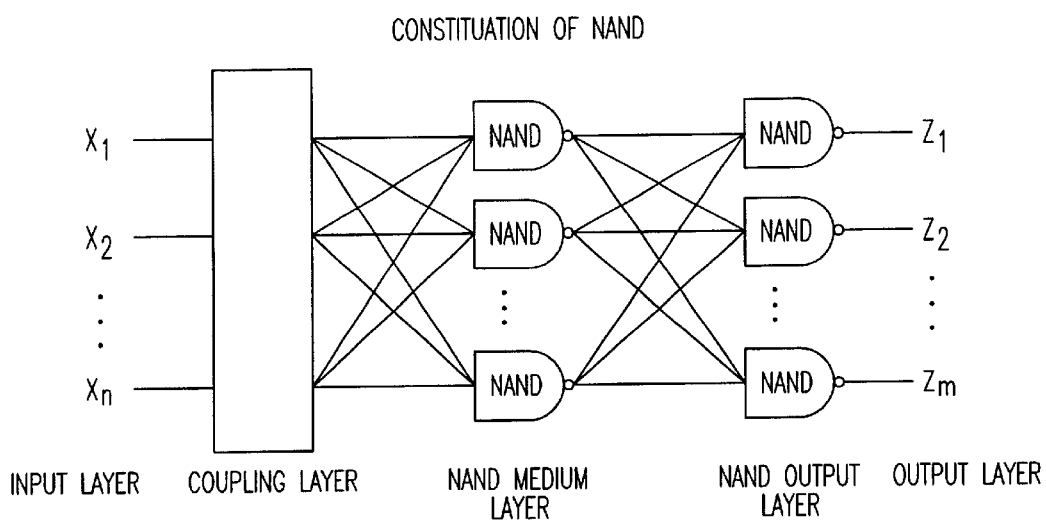
FIG. 8 is the learning network with the binary system including NAND medium layer and NAND output layer, illustrated to blocks.
Figure 9:
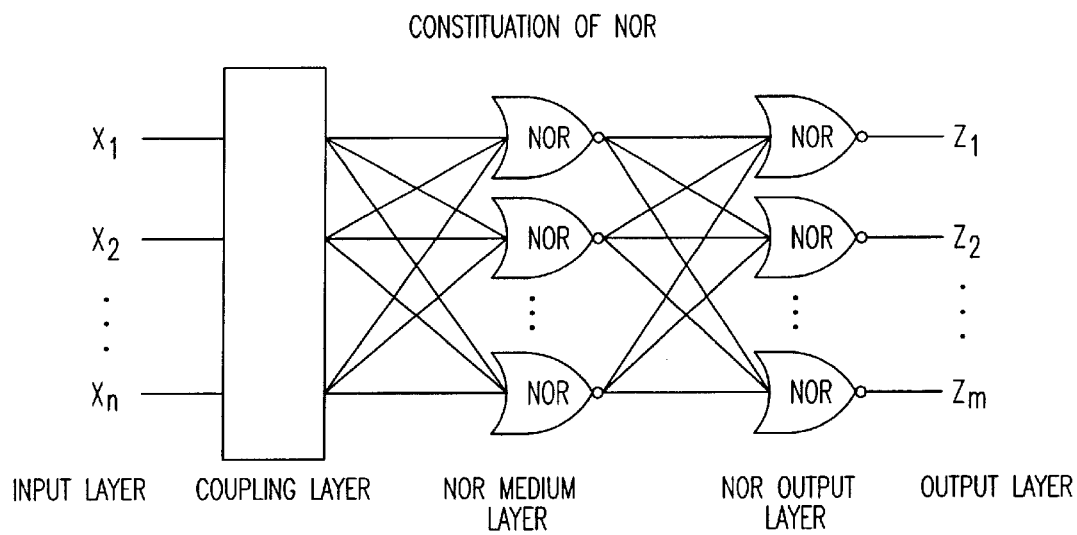
FIG. 9 is the learning network with the binary system including NOR medium layer and NOR output layer, illustrated to blocks.
Figure 10:
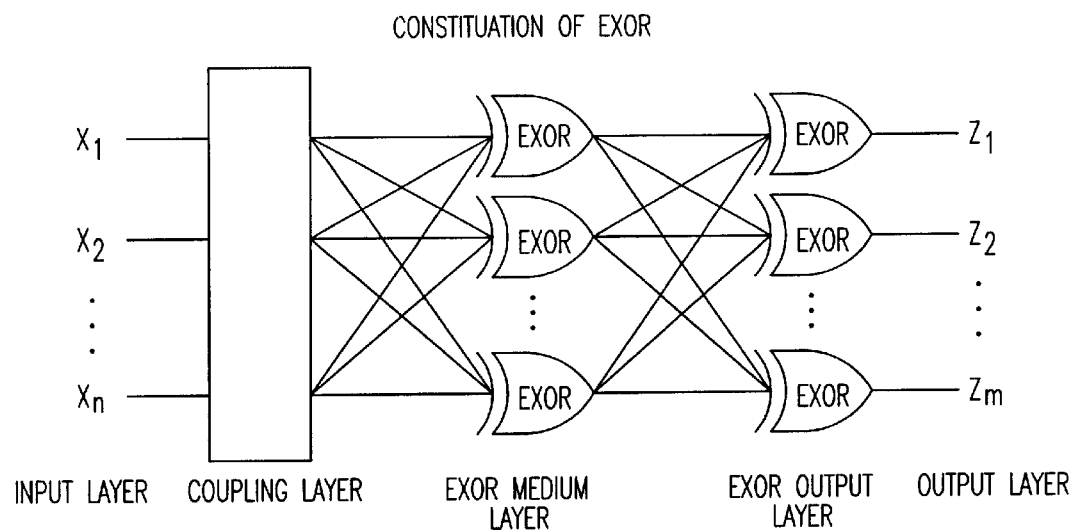
FIG. 10 is the learning network with the binary system including EXOR medium layer and EXOR layer, illustrated to blocks.

[2-to-1 selector] 12 has two input terminals 10, 11 and a selecting terminal S. If the signal of the terminal S is 0, the terminal 10 is selected, and if the signal S is 1, the terminal 11 is selected. Such [2-to-1 selector] 12 may use a logical circuit as shown in FIG. 6.

Accordingly, if the input X is 1, RS-FF11 sets up 1 so that [2-to-1 selector] 12 selects 11, then X is directly coupled to the AND gate, and if the input X is 0, RS-FF11 resets 0 so that [2-to-1 selector] 12 selects 10, then X is coupled to the AND gate through an inverter 20.

The control circuit 4 is a function circuit to indicate either one of which the learning operation is practiced or not, according to the outputs of LEARNIG signal, RESET signal, ERROR signal, OR signal and AND signal, and similarly to propose a renewal condition signal (LEARNING ENABLE) to the coupling circuit.

Before learning operation, the control circuit 4 output RESET signal to initiate the conditions of the other circuits to 0, i.e., the output of all the AND gates are set up 0.

In the real learning operation, it must determine either one of the conditions controlled or not by the input X, the output Z, monitor signal T and the output of the AND gate, as it is capable to use a rule of learning concretely mentioned hereinafter.

(1) This system practices the learning operation when the real output Z is different from the monitor output T, but not when it is also similar thereto. The error signal is obtained by the real output Z and monitor signal T (Exclusive OR), i.e., EXOR is 1 as the forward (different) condition, and is 0 as the rear (similar) condition.

(2) The system practices the learning operation in the control circuit to control the each coupling condition in such order to select one from the highest AND gate to the lowest AND gate in the AND layer, i.e., AND1, AND2 . . . , ANDn in order.

Figure 5:
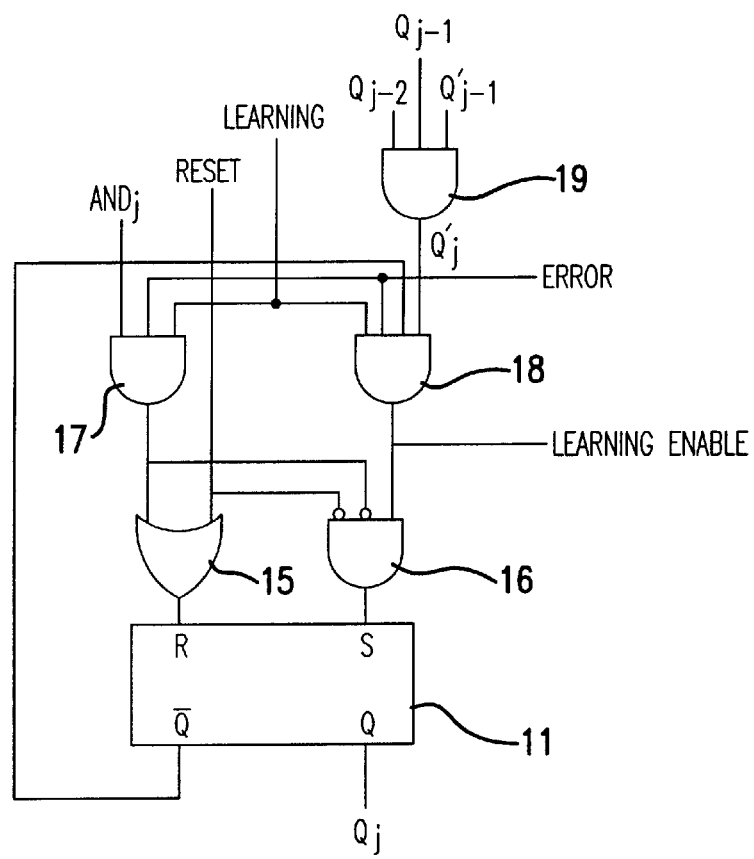
FIG. 5 is the control circuit for learning operation, illustrated.

FIG. 5 indicates the control circuit for practicing such learning system. In this case, RS-FF11 associates to ANDj unit of the AND layer and uses as RS-FF for the learning condition. As the output of RS-FF11 is 1, it indicate that the learning operation is practiced to the AND gate and the output of the AND gate is determined under the input and the coupling condition, and if the output of RS-FF11 is 0, the output of the AND gate is 0 usually not relative to the various inputs, i.e., the learning operation is stopped.

RS-FF resets to 0 by the OR gate and AND gate, as the RESET signal is 1, i.e., the control circuit initiates to 0.

In the learning operation, LEARNING signal is 1, and as ERROR signal is 0, the input of RS-FF is 0 by the OR gate 15, AND gate 16, 17 and 18, so that RS-FF keeps its forward condition, i.e., the learning operation system is in no practice.

While, if the ERROR signal is 1, the learning operation is practiced. Namely, as the monitor signal is 1 and the real output Z is 0, the ERROR signal is 1. In each learning condition RS-FF11, the output of the RS-FF without its learning condition includes Q=0, i.e., Q~=1 so that RS-FF is selected by AND gate 18, and the first one of RS-FF without its learning condition as given Qj-2, Qj-1, Q'j-1, etc., in order, is selected by AND gate 19.

Herein, Qj-2 and Qj-1 are the j-2 output and j-1 output in RS-FF, and Q'j-1 is AND logic obtained by Qj-1 and Qj-2. As ANDj is 0, thus the selected RS-FF determined to R=0 and S=1, so that its RS-FF set up 1, and similarly proposes a newal condition signal (LEARNING ENABLE).

As the ERROR signal is 1, the monitor signal T is 0 and the real output Z is 0, AND gates having all output as 1 are selected by AND gate 17, and RS-FF1 resets to 0 by compulsion, for instance, if ANDj is 1, by AND gates 17, 16 and OR gate 15, RS-FF resets to 0 by compulsion.

As the embodiment mentioned above discloses the system of this invention, the learning operation in the learning network is exactly accomplished to control the coupling condition between the input terminals of the input layer 21 and the respective units of the AND layer, and their conditions are only two, i.e., the direct coupling and through-inverter coupling, so that the constitution of the error revisable circuit is further simplified, and the learning time is shortened near to the prescribed learning effect. Really, the error between the real output and monitor signal is exactly improved to 0.

In the embodiment mentioned above, though the first binary gate layer and the second binary gate layer are AND layer and OR layer respectively, this invention is not limited according to this embodiment, namely, as indicated in FIGS. 7, 8, 9 and 10, the first binary gate may be OR layer with a plurality of OR logical elements, NAND medium layer with a plurality of NAND logical elements, or EXOR medium layer with a plurality of EXOR logical elements, and the second binary gate may be AND layer with a plurality of AND logical elements, NAND output layer with a plurality of NAND logical elements, NOR output layer with a plurality of NOR logical elements, or EXOR output layer with a plurality of EXOR logical elements.

The Effects of this Invention

This invention provides the improved binary system for the learning network, consisting of an input layer having binary input terminals, a coupling layer, a first binary gate layer with first similar logical elements, a second binary gate layer with second similar logical elements, and an output layer, so as to form a learning network, in that each coupling condition between the adjacent layers limited to one way directing from their inlet side to the outlet side, and each layer has independent routes without mutual coupling conditions, the coupling layer having means for selecting either one of a direct coupling condition and a coupling condition routed through an inverter, relative to routes from the respective signal units in the input layer to the respective signal units in the first binary gate layer in the learning network.

Accordingly, the constitution of the error revisable circuit is further simplified, and the learning time is shortened near to the prescribed learning effect. Really, the error between the real output and monitor signal is exactly improved to 0.

The List of FORMULA $$\Delta W \propto -\frac{\partial E}{\partial W} \quad \text{[Formula 1]}$$

$$\Delta \theta \propto -\frac{\partial E}{\partial \theta}$$

$$Z = \overline{X_1}\,\overline{X_2}\,\overline{X_3}\,\overline{X_4} + \overline{X_1}\,\overline{X_2}\,X_3\,X_4 + \overline{X_1}\,X_2\,X_3\,X_4 + X_1\,\overline{X_2}\,X_3\,\overline{X_4} + X_1\,X_2\,X_3\,\overline{X_4} + X_1\,X_2\,X_3\,X_4 \quad \text{[Formula 2]}$$

$$Y_{ij} = \begin{cases} 1 & (W_{ij}X_i \geq \theta_{ij}) \\ 0 & (W_{ij}X_i < \theta_{ij}) \end{cases} \quad \text{[Formula 3]}$$

$$Y_{ij} = \frac{1}{1 + e^{-(wijxi - \theta ij)}} \quad \text{[Formula 4]}$$

$$E = \frac{1}{2}\sum_{i=1}^{m}(Z_i - T_i)^2 \quad \text{[Formula 5]}$$

$$\Delta W = -\varepsilon_w \frac{\partial E}{\partial W} \quad \text{[Formula 6]}$$

$$\Delta \theta = -\varepsilon_\theta \frac{\partial E}{\partial \theta}$$

-continued $$\Delta W_{ij} = -\varepsilon_w \frac{\partial E}{\partial W_{ij}} = -\varepsilon_w \frac{\partial E}{\partial Z} \cdot \frac{\partial Z}{\partial OR} \cdot \frac{\partial OR}{\partial AND_j} \cdot \frac{\partial AND_j}{\partial Y_{ij}} \cdot \frac{\partial Y_{ij}}{\partial W_{ij}} \quad \text{[Formula 7]}$$

$$\Delta \theta_{ij} = -\varepsilon_\theta \frac{\partial E}{\partial \theta_{ij}} = -\varepsilon_\theta \frac{\partial E}{\partial Z} \cdot \frac{\partial Z}{\partial OR} \cdot \frac{\partial OR}{\partial AND_j} \cdot \frac{\partial AND_j}{\partial Y_{ij}} \cdot \frac{\partial Y_{ij}}{\partial \theta_{ij}}$$

$$E = \frac{1}{2}\sum_{i=1}^{m}(Z_i - T_i)^2 = \frac{1}{2}(Z - T)^2 \quad \text{[Formula 8]}$$

$$\frac{\partial E}{\partial Z} = Z - T \quad \text{[Formula 9]}$$

$$\frac{\partial Z}{\partial OR} = 1 \quad \text{[Formula 10]}$$

$$OR = \begin{cases} M & (AND_j < M) \\ AND_j & (AND_j \geq M) \end{cases} \quad \text{[Formula 11]}$$

$$\frac{\partial OR}{\partial AND_j} = Sgn(AND_j - M) = \begin{cases} 0 & (AND_j < M) \\ 1 & (AND_j \geq M) \end{cases} \quad \text{[Formula 12]}$$

$$AND_j = \begin{cases} Y_{ij} & Y_{ij} \leq m \\ m & Y_{ij} > m \end{cases} \quad \text{[Formula 13]}$$

$$\frac{\partial AND_j}{\partial Y_{ij}} = Sgn(m - Y_{ij}) = \begin{cases} 1 & Y_{ij} \leq m \\ 0 & Y_{ij} > m \end{cases} \quad \text{[Formula 14]}$$

$$Y_{ij} = f(x) = \frac{1}{1 + e^{-x}} \quad \text{[Formula 15]}$$

$$X = W_{ij}X_i - \theta_{ij}$$

$$\frac{\partial Y_{ij}}{\partial W_{ij}} = f'(x) \cdot X_i \quad \text{[Formula 16]}$$

$$\frac{\partial Y_{ij}}{\partial \theta_{ij}} = f'(x) \cdot (-1)$$

$$\Delta W_{ij} = -\varepsilon_w (Z - T) Sgn(AND_j - M) Sgn(m - Y_{ij}) X_i \quad \text{[Formula 17]}$$

$$\Delta \theta_{ij} = -\varepsilon_\theta (Z - T) Sgn(AND_j - M) Sgn(m - Y_{ij})(-1)$$

$$\Delta W_{ij} = -2(Z - T) Sgn(AND_j - M) Sgn(m - Y_{ij}) X_i \quad \text{[Formula 18]}$$

$$\Delta \theta_{ij} = (Z - T) Sgn(AND_j - M) Sgn(m - Y_{ij})$$

$$NEX_j = \Sigma W_{ji} \cdot X_i + \theta_j \quad \text{[Formula 19]}$$

$$Y_j = 1/\{1 + \exp(\Sigma W_{ji} \cdot X_i + \theta_j)\} \quad \text{[Formula 20]}$$

What is claimed is:
1. A binary learning network, comprising:
an input layer having binary input terminals;
a coupling layer;
a first binary gate layer with first similar logical elements;
a second binary gate layer with second similar logical elements; and
an output layer;
wherein each coupling condition between adjacent layers is limited to a one way direction from an inlet side to an outlet side, and each layer has independent routes without mutual coupling conditions; having means for limiting selection of a coupling condition to either one of a direct coupling condition or a coupling condition routed through an inverter in the coupling layer, relative to routes from respective signal units in the input layer to respective signal units in the first binary gate layer, such that the selected coupling condition is adapted to eliminate or decrease the respective errors between original output signals at the output layer and monitor signals in the learning network.

2. A binary learning system according to claim 1, wherein the first and second logical elements include pluralities of OR gate and AND gate circuits respectively.

3. A binary learning system according to claim 1, wherein the first and second logical elements include pluralities of AND gate and OR gate circuits respectively.

4. A binary learning system according to claim 1, wherein the first and second logical elements include pluralities of NAND gate and NAND gate circuits respectively.

5. A binary learning system according to claim 1, wherein the first and second logical elements include pluralities of NOR gate and NOR gate circuits respectively.

6. A binary learning system according to claim 1, wherein the first and second logical elements include pluralities of EXOR gate and EXOR gate circuits respectively.

7. A process for performing binary learning using a binary learning network including:

an input layer having binary input terminals;

a coupling layer;

a first binary gate layer with first similar logical elements;

a second binary gate layer with second similar logical elements; and an output layer;

wherein each coupling condition between adjacent layers is limited to a one way direction from an inlet side to an outlet side, and each layer has independent routes without mutual coupling conditions; having means for limiting selection of a coupling condition to either one of a direct coupling condition or a coupling condition routed through an inverter in the coupling layer, relative to routes from respective signal units in the input layer to respective signal units in the first binary gate layer, such that the selected coupling condition is adapted to eliminate or decrease the respective errors between original output signals at the output layer and monitor signals in the learning network; the process comprising the acts of:

(1) selecting one of the coupling conditions in the case of the original output signal being different from the monitor signal, and neglecting the learning.in the case wherein both signals are the same;

(2) learning by selecting one of the coupling conditions between the signal units in the input layer and the signal units in the first binary gate layer in order of a unit selection from a highest position to a lowest position in the first binary gate layer, and to select all input terminals in each unit at the same time or the highest position to the lowest position in the input layer; and (3) after selecting the coupling condition to the lowest positioned unit, again performing the learning onto the highest position as is necessary.

8. A binary learning system according to claim 7, wherein the first and second logical elements include pluralities of OR gate and AND gate circuits respectively.

9. A binary learning system according to claim 7, wherein the first and second logical elements include pluralities of AND gate and OR gate circuits respectively.

10. A binary learning system according to claim 7, wherein the first and second logical elements include pluralities of NAND gate and NAND gate circuits respectively.

11. A binary learning system according to claim 7, wherein the first and second logical elements include pluralities of NOR gate and NOR gate circuits respectively.

12. A binary learning system according to claim 7, wherein the first and second logical elements include pluralities of EXOR gate and EXOR gate circuits respectively.

* * * * *